United States Patent [19]
Hill

[11] Patent Number: 4,966,640
[45] Date of Patent: Oct. 30, 1990

[54] ADJUSTABLE TIRE RECAPPING APPARATUS

[75] Inventor: Gilbert L. Hill, Troy, N.C.

[73] Assignee: Oliver Rubber Company, Oakland, Calif.

[21] Appl. No.: 374,957

[22] Filed: Jun. 30, 1989

[51] Int. Cl.⁵ .............................................. B29D 30/56
[52] U.S. Cl. ................... 156/394.1; 156/909; 425/17
[58] Field of Search ................. 156/95, 96, 394.1, 909, 156/423; 425/17, 19, 22, 26, 27, 36, 58

[56] References Cited

U.S. PATENT DOCUMENTS 4,579,619  4/1986  Symmes et al. ............... 425/17 X
4,808,256  2/1989  Hill ............................. 156/394.1
4,850,834  7/1989  Hinson et al. ................ 425/19

FOREIGN PATENT DOCUMENTS 153981  9/1985  European Pat. Off. ............ 425/17

Primary Examiner—Michael W. Ball
Assistant Examiner—Geoffrey L. Knable
Attorney, Agent, or Firm—Owen, Wickersham & Erickson

[57] ABSTRACT

A curing ring device for a precured tread rubber recapping apparatus of the type wherein a tire assembly with a strip of tread rubber in place on a tire carcass is surrounded by a flexible envelope. The curing ring device which seals the envelope around the tire in its bead area comprises an annular pressure ring that engages the envelope around the tire bead area and has a plurality of backup pads that engage the inside of the tire bead at spaced apart locations. A single handle controls a linkage system that interconnects the pressure ring and the backup pads and closes them together so that sealing pressure is supplied by the ring against the envelope. The linkage system includes elements enabling the distance between the pressure ring and the backup pads in their closed, clamping position to be adjusted so that tires with different bead thicknesses can be accommodated by the device.

7 Claims, 3 Drawing Sheets

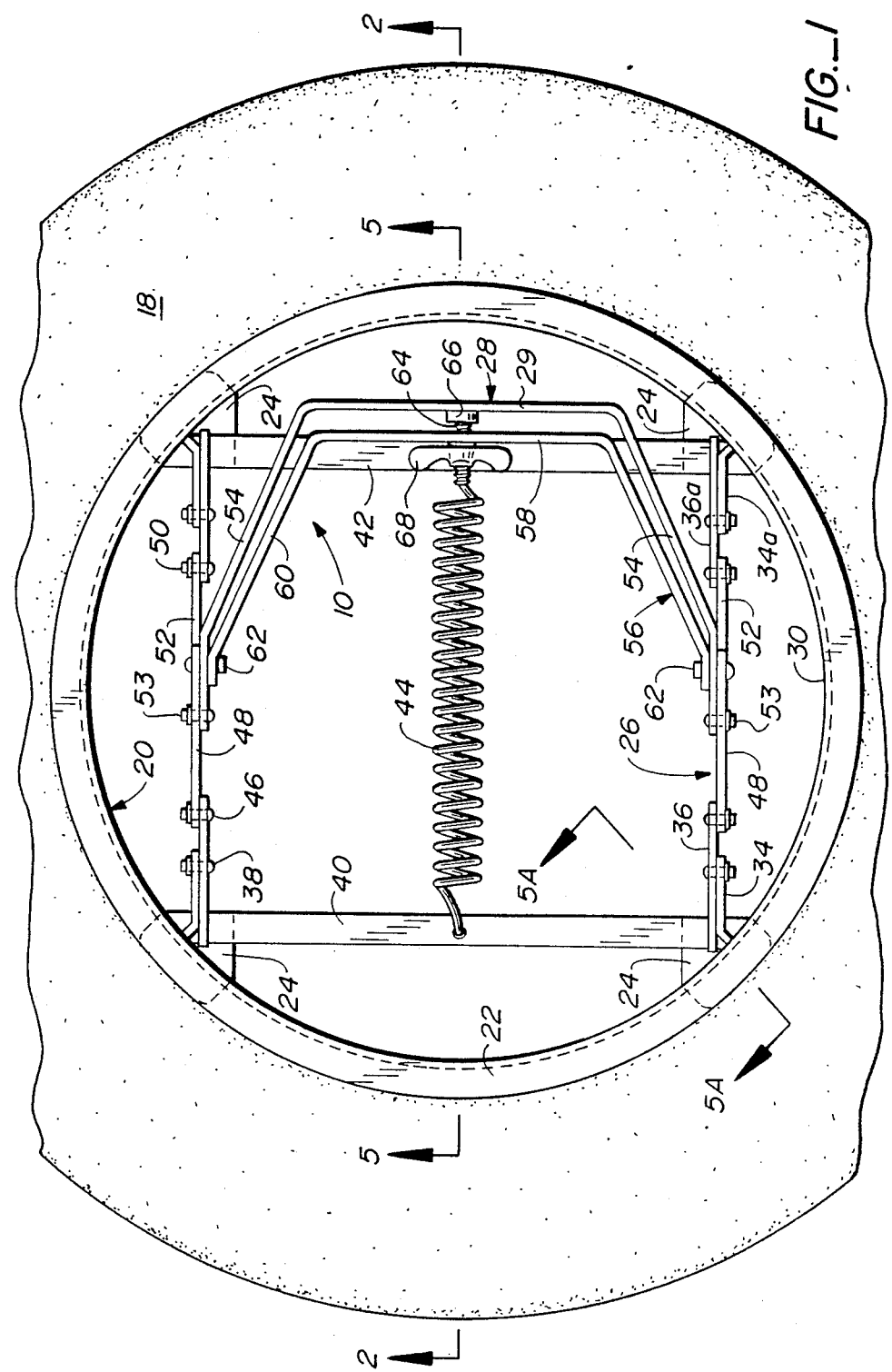
FIG._1

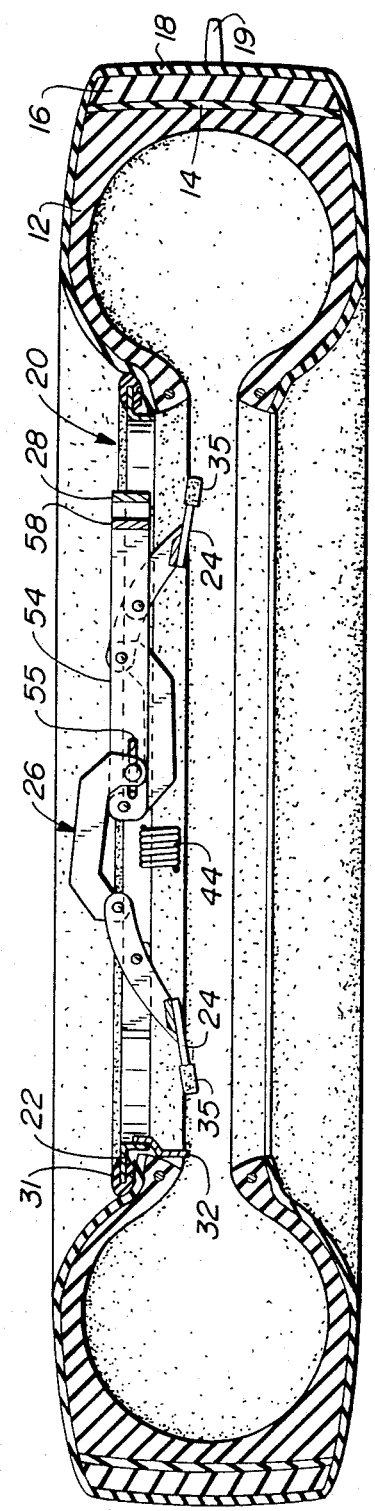
FIG._2
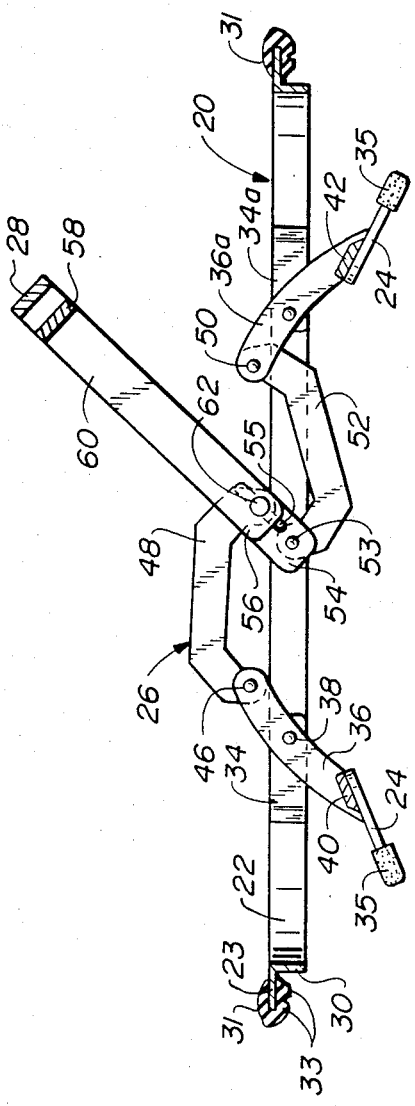
FIG._3

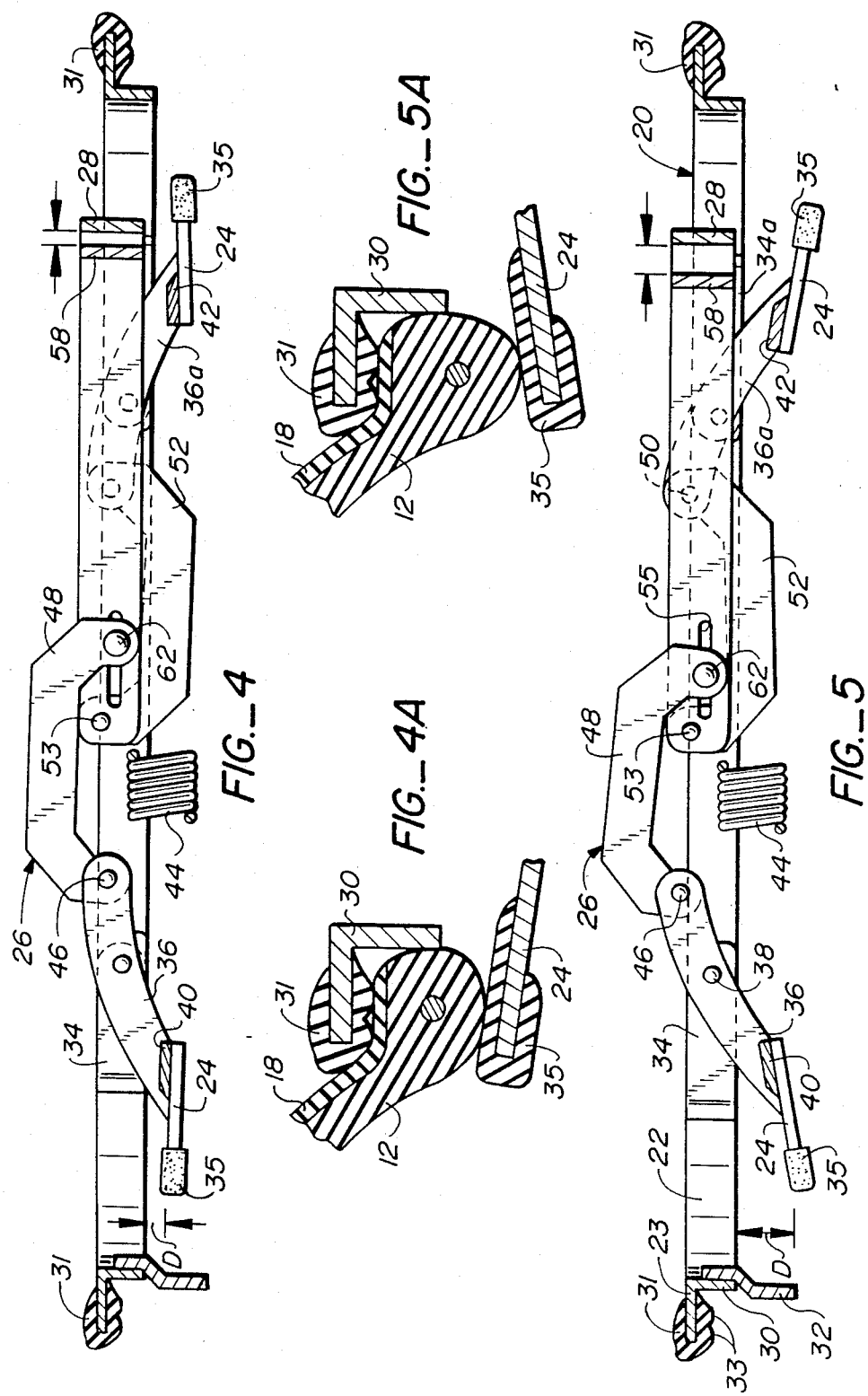

ADJUSTABLE TIRE RECAPPING APPARATUS

This invention relates to an improved apparatus for retreading tires utilizing precured tread rubber, and more particularly to such an apparatus that is adjustable to accommodate tires of different sizes.

BACKGROUND OF THE INVENTION

In U.S. Pat. No. 4,808,256 an apparatus is described for sealing an envelope on a tire as it is being recapped with precured tread rubber. Generally, the apparatus comprises a pair of separate and identical clamping devices that seal the side edges of an annular envelope on the beads of the tire being recapped. The tire casing is first prepared for recapping in the usual manner by first buffing its tread area and then applying a thin layer of uncured cushion gum rubber, over which a precured tread rubber strip is applied and stapled in place. The envelope fits over the tread rubber and must be sealed around the tire bead areas by the clamps so that no air can be trapped between the envelope and the outer surface of the tread rubber and possibly migrate under the tread rubber during a tire retreading procedure.

Each clamping device describe in the aforesaid patent comprises an outer pressure ring sized to fit against the outer bead area of the tire and a series of backup pads adapted to bear against the inside bead area of the tire. A linkage between the pressure ring and the backup pads and controlled by a handle, operates to move the ring towards the pads to grip the tire bead and seal the envelope to it before the tire assembly is placed in a heated pressure chamber during a recapping cycle.

When the pressure ring and backup plates are moved by the linkage against the outer and inner sides of the tire bead, their relative travel from an opening to a closing position must be such that ample sealing pressure is applied by the ring. Since tires of different sizes have bead sections of varying thicknesses, it is necessary that the distance between the pressure ring and backup plates in the closed position be adjustable in order for the clamping apparatus to accommodate a range of different tire sizes.

A general object of the present invention is to solve the aforesaid adjustment problem for a clamping apparatus similar to the one described in U.S. Pat. No. 4,808,256.

A general object of the present invention is to provide an adjustment tire retreading apparatus that will accommodate tires of different bead thicknesses wherein the adjustment mechanism is controlled by a single rotatable element.

Another object of the invention is to provide a clamping device comprising a compression ring and a series of backup pads integrated by linkage having a single handle and an adjustment means in the linkage for changing the distance closed in order to accommodate tires having different bead between the ring and the pads when the clamping device is thicknesses.

Still another object of the invention is to provide an adjustable tire retreading apparatus for sealing an envelope on a tire casing during a retreading process, and one that is easy to operate as well as being well adapted for ease and economy of manufacture.

SUMMARY OF THE INVENTION

An apparatus providing the aforesaid objectives comprises a pressure ring connected by a linkage arrangement to a movable support means for a series of backup pads. The pressure ring is sized to bear against the bead area on the outside of a tire being recapped and the backup pads are movable to positions on the inside of the tire bead area. The linkage which moves the backup plates relative to the pressure ring is controlled by a single handle. In my aforementioned patent, the handle moved pivotally connected links so as to position the backup pads in line with the pressure ring. With the handle in its closed position, the backup pads were spaced at a distance from the pressure ring so as to cause it to apply the amount of pressure against the inside of the tire bead that was necessary to seal an envelope to the tire bead area. In accordance with the present invention, the linkage is modified with an adjustment means that enables the distance between the pressure ring and the backup pads to be varied so that the required amount of sealing pressure can be supplied by the pressure ring and backup plates for tire beads of varying thickness. In the embodiment described, divergent ends of the main handle are slotted to receive a pair of pins. Pivotally attached to the latter is a secondary handle member whose position is adjustable relative to the main handle. When the secondary handle is moved by an adjusting means relative to the main handle, the pins are moved within their slots to adjust the pivot points of linkage elements, resulting in a change in the distance between the backup plates and pressure ring when the handle is closed. This adjustment feature enables the clamping apparatus to accommodate tires with different bead thicknesses during a tire recapping procedure.

Other objects, advantages and features of the invention will become apparent from the following detailed description of one embodiment thereof, presented in conjunction with the accompanying drawing.

BRIEF DESCRIPTION OF THE DRAWING

FIG. 1 is a plan view of a tire recapping apparatus embodying principles of the present invention as it appears when installed on an envelope covered tire, portions of which are broken away for illustrative purposes.

FIG. 2 is a view in elevation and partially in section taken along line 2—2 of FIG. 1 and showing one clamping device for the apparatus of FIG. 1 in its closed position on a tire.

FIG. 3 is a view in elevation and partially in section showing the clamping device of FIG. 2 removed from the tire and in its open position.

FIG. 4 is a somewhat larger view in elevation and partially in section, showing the clamping device of FIG. 1 adjusted for a tire having a relatively thin bead portion.

FIG. 4A is an enlarged fragmentary view in section, showing the device of FIG. 4 attached to the bead portion of a tire.

FIG. 5 is a view in elevation and partially in section taken along the line 5—5 of FIG. 1 and showing the clamping device adjusted for use on a tire having a thicker bead portion.

FIG. 5A is an enlarged fragmentary view in section, showing the device of FIG. 5 attached to the bead portion of a tire.

DETAILED DESCRIPTION OF EMBODIMENT

With reference to the drawing, FIG. 1 shows a tire recapping apparatus 10 embodying principles of the present invention as it appears when installed on a tire 12 that is being recapped using precured tread rubber. In a typical precured recapping process, the tire to be recapped is first prepared by buffing off the old tread. As shown in FIG. 2, the tread area of the tire is first covered with a layer of uncured bonding rubber 14 and then a band or strip of premolded, precured tread rubber 16 is placed over the bonding rubber and its ends stapled together. A flexible curing envelope 18 is then placed over the tire assembly, thereby covering the tread rubber. Normally, a vacuum pump is used to remove air from underneath the envelope through an outlet vale 19. This envelope must then be sealed around the bead areas of the tire so that no air or gas can penetrate under the envelope after the entire tire assembly is placed in a retreading chamber and subjected to heat and pressure to vulcanize the bonding rubber and thereby hold the tread rubber in place on the tire carcass.

In my previous U.S. Pat No. 4,808,256, a recapping apparatus is shown comprising a pair of clamping ring assemblies, each of which functions to grip one bead area of the tire and seal the envelope against it. In the present invention similar clamping ring assemblies 20 are provided, each of which is adjustable so that adequate clamping force can be maintained for tires having different bead thicknesses.

Each clamping assembly 20 has an annular ring member 22 that is sized to fit around the outer bead area of the tire being recapped and a series of four backup pads 24 that are adapted to engage the inner bead area of the tire. A linkage means 26 is connected to both the pressure ring 22 and the backup pads 24 and is controllable by a manually operable handle 28 to move the ring 22 and the pads 24 together. When the tire bead portion is located between the ring and the aligned pads 24, the ring 22 will press the envelope 18 against the tire bead area and thus seal it.

The linkage means 26 is designed so that the handle moves through an intermediate position of maximum resistance before reaching its fully closed position, wherein the handle 28 is substantially in the same plane as the ring member 22, as shown in FIG. 2. When the handle is in this closed position, the distance "D", as shown in FIGS. 4 and 5, between the bearing flange of the ring member 22 and the backup pads 24 is such that a fully adequate compressive force is applied to the envelope on the tire bead area. For tires of different sizes and types, their bead thickness will vary and thus the aforesaid distance "D" between the ring flange and backup plates must be adjustable. In accordance with the present invention, this required adjustability is provided by the linkage means 26.

In FIG. 2, the clamping assembly 20 is shown in its closed sealing position on the tire 12, and in FIG. 3, it is shown off of the tire in its open position. Describing now the clamping ring assembly in greater detail, the pressure ring 22 has a generally right angular cross section with an annular ring portion 23 adapted to bear against the tire sidewall and an integral cylindrical portion 30 which fits just inside the inner edge of the tire bead. Bonded to and surrounding the outer edge of the annular ring portion 23 is a continuous rubber gasket 31. The inner side of this gasket is preferably formed with a serrated surface having at least two concentric circular ridges 33 that can exert concentrated sealing pressure against the tire being processed in its bead area.

Attached to the cylindrical portion 30 of each ring member are a plurality of circumferentially spaced apart guide members 32 that extend longitudinally and help to align the clamping ring assembly 20 with the tire axis when it is installed on a tire being recapped. Also attached and extending inwardly from the cylindrical portion 30 of each pressure ring are four rigid pivot supports 34 (See FIG. 1). Each of these supports is essentially a short strap-line piece of metal which is welded in place at specified locations to the ring portion 30.

As shown in FIGS. 1 and 2, a first pair of curved links 36 are pivotally attached near their mid-points to the outer ends of two supports 34 on one side of each ring portion 30 by a suitable pin 38. On the other side of the ring portion 30, a similar pair of curved links 36a are attached to similar supports 34a.

Attached to one outer end of each curved link 36 and 36a is a backup pad 24 which is essentially a flat, rigid piece of metal, preferably having a roughly triangular shape. Since the pivot supports 34 and 34a, as shown in FIG. 1, are attached to the ring portion 30 at four locations that are essentially equally spaced apart thereon, the backup pads 24 are also located close to the same circumferentially spaced apart positions on each ring assembly 20. Each backup pad 24 is preferably covered by a soft rubber pad 35 which is bonded to both sides and fully covers the inner surface of each pad that contacts the inner bead area of the tire being recapped.

Interconnecting one pair of curved links 36 is a cross bar 40 and the other pair of curved links 36a are similarly interconnected by a cross bar 42. These two parallel bars 40 and 42 are themselves interconnected by a coiled spring 44 which provides a force that constantly urges the bars towards each other.

As seen in FIGS. 3 and 4, the inner end of each of the two curved links 36 is pivotally connected by a pin 46 to one end of another link 48 which is bent with a shallow "U" shape as shown in FIGS. 2 and 4. Similarly, the inner end of each curved link 36a is pivotally connected by a pin 50 to one end of a link 52 which has a U-shape when viewed horizontally.

The handle 28 has a central grip portion 29 with two spaced apart divergent arms 54 extending from ends of the grip portion. The end of each handle arm 54 is pivotally connected by a pin 53 to a link 52. A longitudinal slot 55 is provided at a short distance from the end of each arm 54. (See FIG. 4.) Adjacent the handle 28 is a similarly shaped adjustment member 56 which, as shown in FIG. 1 has a central portion 58 and divergent arms 60 extending from the ends thereof. Fixed to the extreme end of each arm 60 is a transverse pin 62 which extends through and is slidable within a slot 55 in the handle arm 54. Pivotally attached to each transverse pin 62 is the other end of a link 48.

The central portion 29 of the handle and the central portion 58 of the adjustment member 56 are parallel and are connected by a threaded bolt member 64. This bolt member is attached to an enlarged end nut 66 which is itself fixed to the central portion 29 of the handle. The bolt member extends through an opening in the central portion 58 of the adjustment member 56 and a large wing nut 68 is provided on the outer end of the bolt member. Thus, rotation of the wing nut 68 changes the distance between the central portions 29 and 58 of the handle 28 and the adjustment member 56 and this adjustment also moves the transverse pins 62 on the adjustment member arms 60 within the handle slots 55. Movement of these pins within their respective slots changes the pivot point and thus the resultant travel of each link 48 and thus the movement of the curved backup pad links 36 and 36a.

The backup pads 24 are attached to the outer ends of the links 36, 36a by welding and are sloped slightly upward toward the ring 22 when the clamping ring device is in its normally closed position, when adjusted for a tire with relatively narrow or thin bead sections. As shown in FIGS. 4 and 4A, this upward angle relative to the horizontal plane of the ring 22 is preferably around two to three degrees. Thus, as shown in FIGS. 5 and 5A, when the linkage is adjusted for tires having thicker bead sections, the backup plates may have a slight downward angle of as much as three to five degrees with respect to the plane of ring 22. In either case, these extreme angular orientations of the backup plates 24, caused by adjustment of the linkage, do not affect the sealing force of the ring 22.

Operation of the clamping ring assembly 20 can be readily understood by reference to FIGS. 3 and 4. Assume that a tire has been properly prepared for recapping with the bonding layer 14 and tread rubber 16 in place and covered by a flexible envelope 18, as shown in FIG. 2. A ring assembly 20 for each side of the tire can be quickly installed. With the handle 28 in the up position and the backup pads 24 retracted, the annular ring portion 22 is merely placed against the envelope 18 in the bead area of the tire. The guide members 32 serve to position each annular ring member 22 on the tire with no margin for error and thus no requirement for time consuming adjustments. The operator now merely moves the handle 28 to its closed position which is toward the plane of the ring member 22. As this handle movement takes place, the links 36 and 36a are pivoted simultaneously past an equilibrium point to a position where the backup pads 24 engage the inner side of the tire bead. As further pressure is applied, the ring member 22 presses firmly against the envelope in the tire bead area to provide an effective seal. Once the handle reaches the full down position, it automatically stays closed, as a result of the relative position of the links 48 and 52 and the assistance of the coiled spring 44. The latter enables the four backup pads to position themselves at an equal distance from the ring member 22 when the clamp is in its closed position.

When adjustment of the spacing between the annular flange 23 of the ring member 22 and the backup pads 24 is required as, for example, when a tire with a thicker or thinner bead area is being recapped, the wing nut 68 is merely turned to cause the adjustment member 56 to move relative to the handle, thereby moving the pins 62 in their respective slots 55 which changes the position of the backup pad links when the clamping handle is in its closed position. A typical adjustment in the aforesaid manner to accommodate a thicker tire bead is readily apparent from a comparison of FIGS. 4, 4A, 5 and 5A. In FIG. 5, the adjustment member has been moved relative to the handle so as to provide a greater distance between the pressure ring 23 and the backup pads 24 with the handle in its fully closed position.

With both clamping rings 20 installed, the entire tire assembly 10 can be placed in a suitable chamber to complete the recapping process in the conventional manner. After the curing period has been completed, the clamping rings 20 can be quickly and easily removed without special tools or extra labor by merely moving each handle 28 to its open, unlocked position. Thus it is seen that the present invention enables the use of an efficient clamping device with a single handle which can be adjusted to accommodate tires with a wide range of bead thicknesses. Yet, in each case, the adjusted clamping device will provide the annular ring pressure necessary to assure proper sealing of the envelope during the curing process.

The preferred embodiment described herein is intended to be purely illustrative, and not limiting of the scope of the invention. Other embodiments and variations will be apparent to those skilled in the art and may be made without departing from the essence and scope of the invention as defined in the following claims.

What is claimed is:

1. A retreading curing ring apparatus for mounting on a tire retreading assembly that includes a tire carcass defining a retread area and integral sidewalls having inner circular beads adjacent their free ends, a thin layer of uncured rubber positioned on said tread area, a preformed tread strip covering said uncured rubber layer and a flexible envelope surrounding such tread strip and said sidewalls and extending downwardly toward said circular beads, said curing ring apparatus being positioned adjacent one of said sidewalls for securing and sealing said envelope to said tire, said curing ring apparatus comprising:
   a circular body member for engaging a portion of the envelope and the circular tire bead;
   guide means adjacent said circular body member for concentrically aligning said tire carcass relative to said circular body member;
   a plurality of moveable backup means spaced inwardly from said circular body member and at predetermined spaced apart circumferential locations relative to said circular body member and adapted to engage the inside of said tire sidewall in its bead area;
   a single handle means;
   linkage means interconnecting said backup means and said circular body member and controllable by said single handle means for moving said circular body member and said plurality of backup means together, thereby pressing and sealing said envelope against the bead portion of the tire; and
   adjustment means connected to said handle means and said linkage means for varying the distance between said circular body member and said plurality of backup means when said curing ring device is in its closed position, thereby enabling said device to accommodate tires with different bead thicknesses.

2. The curing ring device as described in claim 1 wherein said circular body has a generally right angular cross section including an annular portion for pressing against the envelope and an integral cylindrical portion to which said guide means are attached.

3. The curing ring device described in claim 1 wherein said curing handle means has a central grip section with a pair of diverging arm portions extending from opposite ends thereof and slots in said arm portions; said adjustment means comprising a central member parallel to said handle grip section and arms diverging from said central member; pin means fixed to the ends of said adjustment member, said pin means extending through said slots in said handle arms and pivotally attached to said linkage means; and means for varying the distance between said handle grip section and said central member and thus the position of said pin means in said slots, which results in a variation of the distance between said circular body member and said backup means with the handle means in its closed position.

4. The curing ring device described in claim 3 wherein said linkage means comprises:

first and second pairs of curved links each having an inner end and a said backup means connected to an outer end;

means on said circular body for pivotally supporting each said curved link;

a pair of bars interconnecting each said pair of curved links;

spring means interconnecting said pair of bars for providing a tension force tending to urge said bars towards each other;

a third pair of links each connected at one end to an inner end of a said first curved link and connected at its other end to the ends of said diverging arms of said handle means;

a fourth pair of links each connected at one end to an inner end of a second curved link and connected at its other end to the ends of said arms of the adjustment member through said diverging arms of said handle means at a location thereon spaced from the connection of said third link;

whereby movement of said handle means causes rotation of said first and second pairs of curved links and thus movement of said backup means against the inside of the tire bead at spaced apart locations thereby pressing the tire bead and the envelope against said circular body member.

5. The curing ring device as described in claim 4 wherein said third pair of links are pivotally attached to said pin means of said adjustment member through said slots spaced from the ends thereof and said fourth pair of links are pivotally attached at points located nearer the ends thereof, so that as the handle means is moved in its closing direction, tension is applied to both third and fourth pairs of links, thereby causing them to move said backup means into their closed position.

6. The curing ring device described in claim 3 wherein said means for varying the distance between said handle grip and said control member comprises a threaded bolt fixed to said handle grip and extending through an opening in said central member, and nut means threaded to said bolt and bearing against said central member.

7. The curing ring device described in claim 4 wherein said third and fourth pairs of links have an elongated shape with angular end portions forming a general U-shaped configuration.

* * * * *